T. J. SHEA.
MAGNETIC RIVET HEATER AND SPOT WELDER.
APPLICATION FILED SEPT. 24, 1918.
1,302,230.
Patented Apr. 29, 1919.
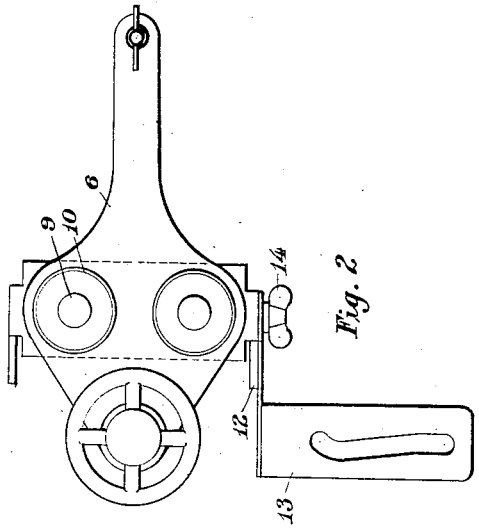
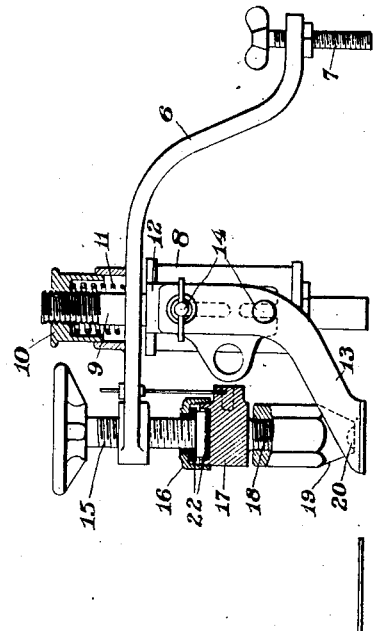
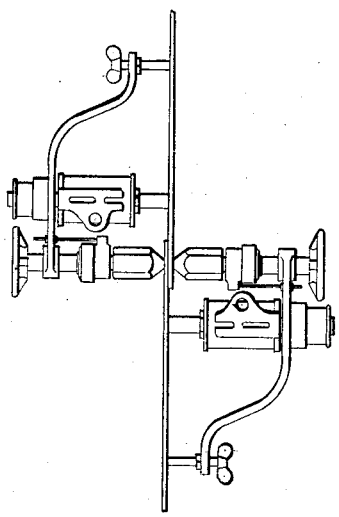
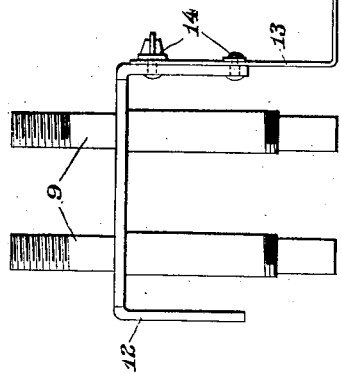
Inventor
Thomas J. Shea
By Geo. E. Tew
Attorney

UNITED STATES PATENT OFFICE.

THOMAS J. SHEA, OF PORTLAND, OREGON.

MAGNETIC RIVET-HEATER AND SPOT-WELDER.

1,302,230.  Specification of Letters Patent.  Patented Apr. 29, 1919.

Application filed September 24, 1918. Serial No. 255,480.

*To all whom it may concern:*

Be it known that I, THOMAS J. SHEA, a citizen of the United States, residing at Portland, in the county of Multnomah and State of Oregon, have invented certain new and useful Improvements in Magnetic Rivet-Heaters and Spot-Welders, of which the following is a specification.

In my pending application, Serial No. 253,553, filed September 11, 1918, there is disclosed a magnetic dolly bar for holding rivets while they are being headed and comprising a lever frame provided with an electric magnet, which holds the same to the plates being riveted and also holds a rivet set against the head of the rivet while it is being fixed in the plates.

The present invention is an improvement or modification of the device shown in said application, and has for its object to provide an electromagnetic rivet heater and spot welder by means of which the rivet will be heated and headed in position or spot welding may be carried on by changing the points or dies. For this purpose I employ a magnetic holding-on frame disclosed in the former application, and associate therewith the rivet heating device or point which may be applied to the rivet for the purpose of heading the same without the use of an impact riveting tool. Although particularly useful in riveting, the tool will also be found very useful in spot welding and similar operations.

In the accompanying drawing. Figure 1 is a side elevation of the tool. Fig. 2 is a plan. Fig. 3 is an end elevation of the magnet frame, Fig. 4 is an elevation showing the use of two of the devices for spot welding.

Referring specifically to the drawings, 6 indicates a holding or lever frame provided at one end with an adjustable fulcrum screw 7. This frame supports the electric magnet 8 which may have one or more cores and the yoke of which is provided with studs 9 which extend through holes in the frame and are provided with screw caps 10 between which and the frame are confined coiled springs 11 which transmit the pull or pressure of the magnet to the frame, and yieldingly hold it to the work. These springs might be located at other positions between the lever frame and the parts applied to the work. The yoke has also depending arms 12 which support a spacing templet 13, attached by a rivet and screw to either one of the arms as indicated at 14, and adapted to provide quick and accurate shifting of the tool to its new position for the next rivet.

By the present invention the frame is provided with a rivet heating, or a spot welding, attachment. This comprises a pressure spindle or screw 15 which is tapped through the end of the frame beside the magnet, and the inner end of this screw is provided with a coupling 16 which connects the screw to a terminal holder or plug 17 to which the coupling is screwed, so that it may be advanced or retracted by the pressure spindle 15. The terminal holder has a threaded stud 18 which screws into a socket in a rivet heating point 19. Different kinds of points may be used according to the nature of the work at hand. The rivet heating point will preferably have a recess 20 in the end to receive and shape the end of the rivet. For spot welding a plain smaller point will be used. The holder 17 is insulated from the coupling 16 as shown at 22.

In the use of the device the frame is applied to the plates or other work beside the point and when the magnet 8 is energized it will be clamped to the work by the magnetic attraction, the templet 13 acting in the case of the rivet heater to assist in quickly and accurately shifting the device to the next position. The rivet heating point 19 is advanced to contact with the rivet with sufficient force to insure a good conducting contact. The heating current is then supplied through the connections to the terminal holder 17, and passing through the heating point the rivet is heated to a white heat and compressed into shape, or headed, by means of the magnetic attraction exerted through the frame of the device. The screw 15 also provides an adjustment to suit the nature of the work and to advance the heating point to the desired contact.

It will be appreciated that the device may readily be used for spot welding as shown in Fig. 4, the points being applied to the spot to be heated and the tool has the advantage that it is held in place by the magnetic attraction of the magnet 8, so that the operator does not have to support the device in position; and the pressure is a yielding one by reason of the springs 11. Furthermore, the magnetic action provides the necessary pressure to clamp the edges of the plates together, to accomplish either compression of the rivet or effective welding conditions, as the case may be.

The invention is not limited to the particular construction shown but may be modified in various ways within the scope of the following claims.

I claim:

1. The combination of a frame, a magnet carried thereby and adapted to hold the frame to the work, and an electric heating member mounted on the frame.

2. The combination of a frame, a magnet carried thereby and adapted to hold the frame to the work and an electric terminal holder carried by the frame and provided with a heating contact point adapted to be applied to the work to be heated.

3. The combination with an electric terminal heating point adapted to be applied to the work to be heated, of electro-magnetic means to hold said point to the work.

4. A tool comprising a frame, a magnet carried thereby and adapted to hold the tool to the work, and an electric terminal heating point carried by the frame and located beside the magnet and adapted to contact with the part of the work to be heated.

5. A tool comprising a frame, a magnet carried thereby and adapted to hold the tool to the work, an electric terminal heating point, carried by the frame, and means to advance and retract said point, to and from the work.

6. A tool comprising a frame, means to hold the same to the work, a screw mounted in the frame, and an electric heating point connected to the screw and adapted to be advanced or retracted thereby, to and from the work.

7. A tool comprising a frame, an electric heating point carried thereby, a magnet adapted to attach itself to the work, and a spring between the magnet and the frame, to yieldingly press the point against the work.

8. A tool comprising a frame provided with a magnet adapted to engage lapped plates or the like, and an electric terminal heating point carried by the frame in position to contact with the work.

9. A tool comprising a frame, an electric heating point carried thereby, a magnet carried by the frame and adapted to attach itself to the work, and means to yieldingly press the point against the work.

10. A dolly comprising a frame having a rivet engaging device, a magnet carried by the frame and adapted to hold the frame to the work, and a templet carried by the frame and adapted to position the device with respect to the rivets.

In testimony whereof, I affix my signature in presence of two witnesses.

THOMAS J. SHEA.

Witnesses:
  GEO. E. TEW,
  CHARLES J. DIECKMAN.